UNITED STATES PATENT OFFICE 2,137,792

ORGANIC PHOSPHORUS-CONTAINING COMPOUNDS

Willard H. Woodstock, Homewood, Ill., assignor to Victor Chemical Works, Chicago, Ill., a corporation of Illinois No Drawing. Application September 12, 1936, Serial No. 100,558

15 Claims. (Cl. 260—461)

This invention relates to a method of producing organic phosphorus-containing compounds, and more particularly to new phosphinic acid and ester products.

Preparation of phosphinic acids of the lower paraffin compounds from mercury alkyls has heretofore been suggested, and the preparation from benzene by treatment with aluminum chloride and phosphorus trichloride has also been suggested. These suggestions have never reached commercial use as far as is known, however.

It has now been discovered that not only aromatic hydrocarbons may be reacted with aluminum chloride and phosphorus trichloride in this manner, but that other hydrocarbons may likewise be used as a basis for the reaction. These consist chiefly of aliphatic straight chain hydrocarbons, aliphatic branched chain hydrocarbons, cyclic hydrocarbons, with or without side chains (naphthenes) and aromatic hydrocarbons with side chains of one of the above. Such compounds are commonly found in petroleum, but may be obtained from other sources. Preferably, the petroleum compounds should contain more than five carbon atoms inasmuch as the lower compounds react with the phosphorus trichloride to produce elemental phosphorus, the amount of the elemental phosphorus being greatly increased as the molecular weight of the hydrocarbon decreases.

The reaction is believed to occur by the formation of an addition product of the hydrocarbon, the aluminum chloride and the phosphorus trichloride with loss of hydrochloric acid and then by hydrolysis of this intermediate compound with water resulting in the production of the phosphinic acid with the liberation of aluminum chloride and further hydrochloric acid.

By means of this invention esters of the phosphinic acids may likewise be produced by treatment of the intermediate addition compound with an alcohol or phenol and then carrying out the hydrolysis.

It is believed that the type of reactions are as follows:

$$R\text{—}H + AlCl_3 + PCl_3 = R\text{—}PCl_2 \cdot AlCl_3 + HCl$$

$$R \cdot PCl_2 \cdot AlCl_3 + 2H_2O = R\text{—}PHO(OH) + AlCl_3 + 2HCl$$

and where the ester is to be formed as follows:

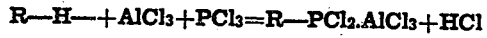
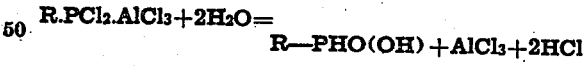

"R" may represent any aliphatic or aromatic group and "R'OH" any alcohol or any phenol.

The following examples illustrate the general procedure and type of reaction:

I 500 cc. of commercial hexane were reacted with 100 grams of $PCl_3$ and 100 grams of $AlCl_3$ at 60–90° C. in a flask fitted with a reflux condenser. Hydrochloric acid was given off in considerable amount during the reaction. After the evolution of HCl ceased, the excess hexane was distilled off and the residue poured into hot water. It was orange colored due to the presence of finely divided red phosphorus. The product was washed with hot water until free of aluminum chloride. It was dissolved in benzene and the red phosphorus filtered off. The benzene was then distilled off leaving a transparent, almost colorless oil containing 13.2% of organically combined phosphorus.

In order to produce the ester the process was repeated except that at the end of the first stage of the reaction 54 grams of butanol were added and the heating continued at 100° C., causing further splitting off of hydrochloric acid. The excess hexane was distilled off and the product treated as above. The ester product formed was a transparent colorless oil containing organically combined phosphorus.

II

With ligroin the reaction and products were quite similar to those of the above hexane. Ligroin is a petroleum fraction containing approximately 6 to 9 carbon atoms and may contain appreciable amounts of hexane. Red phosphorus was also formed during the reaction.

III 500 cc. of kerosene were reacted with 100 grams of $AlCl_3$ and 100 grams of $PCl_3$ up to a temperature of 150° C. in a flask with reflux condenser. After 8 to 10 hours HCl equivalent to ⅓ of the chlorine in the $PCl_3$ was split off. The excess unreacted kerosene was decanted or vacuum distilled off up to 150° C. This product was a soft to brittle solid at room temperature. It was hydrolyzed with hot water and washed until free of aluminum chloride. The resulting organic phosphorus containing compound, when dried at 100°, was a brown, soft to brittle solid, and weighed 169 grams. It contained 9.85% phosphorus and represented a yield of 74% based on the phosphorus trichloride used. It was soluble in benzene, toluol, acetone, alcohol, but only slightly soluble in kerosene and water.

In a variation of the above process, 54 grams of butanol was added to the intermediate addition product and the heating continued up to 150° C. with the additional splitting off of HCl. The product was then poured into hot water which released a third equivalent of HCl and also set free the aluminum chloride. The aluminum chloride was removed by washing, the aqueous layer decanted off, and the excess kerosene distilled, leaving an ester compound which contained 8.23% of phosphorus and represented a yield of 57% based on the PCl₃ used.

IV

Gas oil and lubricating oil fractions reacted similarly and gave similar phosphorus containing acids and esters.

V 300 cc. of benzene, 100 grams of PCl₃ and 100 grams of AlCl₃ were heated up to 80° C. in a flask fitted with a reflux condenser. After 4½ hours, one-third of the chlorine in the PCl₃ was given off as HCl. 68.5 grams of phenol were then run into the mixture and the heating continued until another equivalent of HCl was liberated. The excess benzene was distilled off and the molten product poured slowly into water and washed to remove the aluminum chloride. The ester product was a light yellow soft mass at room temperature and contained 11.2% of phosphorus. The yield was 80.0% based on the PCl₃ used.

It is preferred to use the aluminum chloride in substantially molecular proportions in order to carry out the reaction in a short time.

The use of an excess of hydrocarbon is not essential in the above reactions but serves the purpose of a diluent and facilitates the carrying out of the reaction.

Elemental phosphorus is not produced in petroleum hydrocarbons having carbon atoms greater than hexane and ligroin. While the complex composition of petroleum oil fractions renders it impossible to definitely assign a chemical composition to the new products, they are believed to be phosphinic type acids of the general type formula

and the esters are probably of the type formula

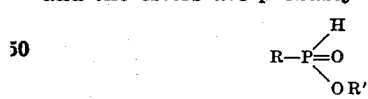

The phosphinic acids may be converted by partial oxidation into phosphonic acids and their derivatives which are suitable for detergent and wetting-out purposes.

Other metallic chlorides such as tin, copper, zinc, iron, mercury and titanium may be employed in place of the aluminum chloride, but the lower cost and greater efficiency of the latter make it preferable.

The foregoing detailed description has been given for clearness of understanding only and no unnecessary limitations should be understood therefrom, but the appended claims should be construed as broadly as permissible in view of the prior art.

I claim:

1. A composition of matter comprising essentially a phosphinic acid of an aliphatic petroleum hydrocarbon containing more than five carbon atoms.

2. A composition of matter comprising essentially the mixed phosphinic acids of a petroleum hydrocarbon fraction containing at least one aliphatic hydrocarbon having more than five carbon atoms.

3. As a new compound an organic phosphorus-containing substance of the type formula

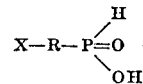

where X is any hydrocarbon radical and R is an aliphatic hydrocarbon group and X—R contains more than five carbon atoms.

4. A compound as set forth in claim 2 in which the hydrocarbon fraction is kerosene.

5. As a composition of matter, esters of aliphatic hydrocarbon phosphinic acids in which the acid has more than five carbon atoms.

6. A compound of the type formula

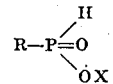

where "R" is any aliphatic hydrocarbon radical having at least six carbon atoms and "X" is a member of the group consisting of hydrocarbon radicals and a hydrogen atom.

7. A product as in claim 6 where "R" is a kerosene hydrocarbon radical.

8. The method of preparing a phosphorus containing organic compound which comprises reacting an aliphatic petroleum hydrocarbon with phosphorus trichloride and aluminum chloride whereby hydrogen chloride is split off, and hydrolyzing the resulting product with water, whereby additional hydrogen chloride is split off and the aluminum chloride set free, and separating the final product from the aqueous solution of aluminum chloride and hydrochloric acid.

9. The method as set forth in claim 8, in which the hydrocarbon is an aliphatic saturated hydrocarbon of more than five carbon atoms.

10. The method of preparing a phosphorus containing organic ester compound which comprises reacting a petroleum hydrocarbon with phosphorus trichloride and aluminum chloride, splitting off hydrogen chloride, and reacting the resulting complex product with an alcohol whereby additional hydrogen chloride is split off, and subsequently hydrolyzing with water to split off a third portion of hydrogen chloride and set free the aluminum chloride, and separating the product from the aqueous solution of aluminum chloride and hydrochloric acid.

11. The method as set forth in claim 10, in which the ester is formed by adding an aromatic alcohol.

12. The method of preparing a phosphorus containing organic compound which comprises reacting an aliphatic hydrocarbon with phosphorus trichloride and aluminum chloride in the presence of an excess of hydrocarbon whereby hydrogen chloride is split off, and hydrolyzing the resulting product with water, whereby additional hydrogen chloride is split off and the aluminum chloride set free, and separating the final product from the aqueous solution of aluminum chloride and hydrochloric acid.

13. The method of preparing a phosphorus containing organic compound which comprises reacting an aliphatic petroleum hydrocarbon with phosphorus trichloride and a chloride of a metal of the class consisting of aluminum, tin, copper, zinc, iron, mercury and titanium, whereby hydrogen chloride is split off, and hydrolyzing the resulting product with water, whereby additional hydrogen chloride is split off and the chloride is set free, and separating the final product from the aqueous solution of chloride and hydrochloric acid.

14. As a new product, an addition product of a chloride of a metal of the class consisting of aluminum, tin, copper, zinc, iron, mercury, and titanium and a petroleum hydrocarbon dichlorphosphine in which the hydrocarbon is an aliphatic hydrocarbon having more than five carbon atoms.

15. A compound of the type formula

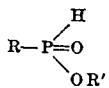

wherein "R" is any hydrocarbon radical having at least six carbon atoms, and "R'" is a hydrocarbon group.

WILLARD H. WOODSTOCK.